(12) United States Patent
Niewiadomski et al.

(10) Patent No.: US 11,505,124 B2
(45) Date of Patent: Nov. 22, 2022

(54) ALIGNMENT POSITION ADAPTATION FOR FIFTH WHEEL TRAILERS IN HITCH ASSIST OPERATION

(71) Applicant: Ford Global Technologies, LLC, Dearborn, MI (US)

(72) Inventors: Luke Niewiadomski, Dearborn, MI (US); Roger Arnold Trombley, Ann Arbor, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 16/657,100

(22) Filed: Oct. 18, 2019

(65) Prior Publication Data

US 2021/0114521 A1 Apr. 22, 2021

(51) Int. Cl.
| | |
|---|---|
| *B60D 1/01* | (2006.01) |
| *B60R 1/00* | (2022.01) |
| *B60D 1/26* | (2006.01) |
| *B62D 13/06* | (2006.01) |
| *B62D 15/02* | (2006.01) |
| *G05D 1/02* | (2020.01) |

(52) U.S. Cl.
CPC .............. *B60R 1/003* (2013.01); *B60D 1/015* (2013.01); *B60D 1/26* (2013.01); *B62D 13/06* (2013.01); *B62D 15/025* (2013.01); *G05D 1/0212* (2013.01); *G05D 1/0231* (2013.01); *G05D 2201/0213* (2013.01)

(58) Field of Classification Search
CPC . B60D 1/015; B60D 1/26; B60D 1/36; B60D 1/62; G05D 1/0212; G05D 1/0231; G05D 2201/0213; B62D 13/06; B62D 15/025; B62D 15/0285; B60R 1/00; B60R 1/003; B60R 2300/808
See application file for complete search history.

(56) References Cited

U.S. PATENT DOCUMENTS

| | | |
|---|---|---|
| 6,769,709 B1 | 8/2004 | Piper et al. |
| 8,976,246 B1 | 3/2015 | Rappuhn |
| 2002/0100175 A1 | 8/2002 | King |
| 2007/0216136 A1 | 9/2007 | Dietz |
| 2015/0054950 A1* | 2/2015 | Van Wiemeersch ........................ G06T 7/0008 382/104 |
| 2017/0151846 A1* | 6/2017 | Wuergler ............ B62D 15/029 |

(Continued)

*Primary Examiner* — Hunter B Lonsberry
*Assistant Examiner* — Matthew J. Reda
(74) *Attorney, Agent, or Firm* — Gregory Brown; Price Heneveld LLP

(57) ABSTRACT

A vehicle hitch assistance system includes a first image sensor in connection with a portion of the vehicle and positioned forward of a forward hitch disposed in a cargo bed of the vehicle. The system further includes a controller configured to capture first image data with the first image sensor. The first image data depicts a coupler of a trailer. The controller is further configured to identify a trailer type of the trailer based on the first image data. The trailer type is configured to connect to the forward hitch. The controller is further configured to acquire position data identifying a coupler position of the coupler in the first image data, derive a vehicle path aligning the forward hitch with the coupler, and control a maneuvering system driving the vehicle along the vehicle path.

19 Claims, 10 Drawing Sheets

(56) References Cited

U.S. PATENT DOCUMENTS

2018/0208187 A1* 7/2018 Lewis ............. B60W 30/18036
2018/0312112 A1* 11/2018 Lewis .................... G06V 20/56
2019/0152387 A1* 5/2019 Naserian ................. B60Q 9/00

* cited by examiner

ALIGNMENT POSITION ADAPTATION FOR FIFTH WHEEL TRAILERS IN HITCH ASSIST OPERATION

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Accordingly, further advancements may be desired.

SUMMARY OF THE DISCLOSURE

According to one aspect of the present disclosure, a vehicle hitch assistance system is disclosed. The system comprises a first image sensor in connection with a portion of the vehicle and positioned forward of a forward hitch disposed in a cargo bed of the vehicle. The system further comprises a controller configured to capture first image data with the first image sensor. The first image data depicts a coupler of a trailer. The controller is further configured to identify a trailer type of the trailer based on the first image data. The trailer type is configured to connect to the forward hitch. The controller is further configured to acquire position data identifying a coupler position of the coupler in the first image data, derive a vehicle path aligning the forward hitch with the coupler, and control a maneuvering system driving the vehicle along the vehicle path.

Various aspects of the disclosure may include any one or a combination of the following features:
  the controller is further configured to distinguish the trailer type as a fifth-wheel trailer or a gooseneck trailer from an A-frame trailer;
  the trailer type is determined as a first type configured to connect with a rear hitch of the vehicle and a second type configured to connect to the forward hitch in the storage compartment;
  the controller is configured to activate a type-specific navigation operation of the vehicle based on the trailer type;
  a user interface, wherein the controller is configured to prompt a user to verify the navigation operation of the trailer based on the trailer type;
  the vehicle path directs the coupler through an opening formed by an open or removed tailgate between side portions of the cargo bed;
  the coupler of the trailer is elevated and configured to extend above the storage compartment in the form of a fifth wheel or gooseneck coupler;
  the controller is further configured to project the coupler position along a height of the coupler to a plane vertically aligned with the forward hitch;
  the first image sensor is positioned above a rear windscreen of the vehicle;
  the controller is further configured to detect a position of the forward hitch in the cargo bed by processing the first image data;
  the controller is further configured to detect at least one of an open status and a connection status of a tailgate of the vehicle based on the first image data;
  a second image sensor configured to capture second image data in connection with a tailgate or a portion forming a rear extent of the vehicle;
  the controller is further configured to detect a status of the tailgate based on a connection status of the second image sensor in connection with a portion of the vehicle aft of the forward hitch;
  the status of the tailgate is identified in response to the second image data captured by the second image sensor depicting a ground portion different from a scene depicted in the second image data; and/or
  the status of the tailgate is identified by comparing the first image data captured by the first image sensor with the second image data captured by the second image sensor.

According to another aspect of the present disclosure, a method for controlling an automated vehicle hitch assistance system is disclosed. The method comprises capturing first image data with a first image sensor in connection with a portion of the vehicle and positioned forward of a forward hitch position in a cargo bed of the vehicle. The method further comprises identifying a coupler position and a trailer type of a trailer in the first image data. In response to the trailer type being configured to connect with the forward hitch, the method further comprises detecting a presence of the forward hitch in the cargo bed based on the first image data. In response to a negative search result for the forward hitch in the cargo bed, the method further comprises outputting an indication that the forward hitch is not identified. In response to a positive search result for the forward hitch in the cargo bed, the method further comprises controlling the vehicle to maneuver the forward hitch position to align with the coupler position.

Various aspects of the disclosure may include any one or a combination of the following features or steps:
  detecting a status of a tailgate of the vehicle, and in response to the status of the tailgate being in a closed position, outputting an indication to open or remove the tailgate;
  the connection status of the tailgate is determined based on at least one of: processing the first image data and identifying at least one of a connection and an orientation of the tailgate based on the first image data, and detecting an orientation of the tailgate based on second image data captured by a second image sensor in connection with a tailgate or a portion forming a rear extent of the vehicle; and/or
  detecting a forward hitch position of the forward hitch in the image data, and calculating an alignment path from the forward hitch position to the coupler position.

According to yet another aspect of the present disclosure, a vehicle hitch assistance system is disclosed. The system comprises an image sensor in connection with a portion of the vehicle and positioned forward of a forward hitch disposed in a cargo bed of the vehicle. The system further comprises a controller configured to capture image data with the image sensor, wherein the image data depicts a coupler of a trailer and identify a trailer type of the trailer based on the first image data. The trailer type comprises an elevated coupler configured to connect to the forward hitch. The controller is further configured to detect at least one of a status of a tailgate of the vehicle based on the first image data. In response to the tailgate being oriented in a closed position, the controller is configured to output a notification indicating the closed position and derive a vehicle path aligning the forward hitch with the coupler. The vehicle path comprises type-specific navigation based on the trailer type. The controller is further configured to control a maneuvering system driving the vehicle along the vehicle path.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
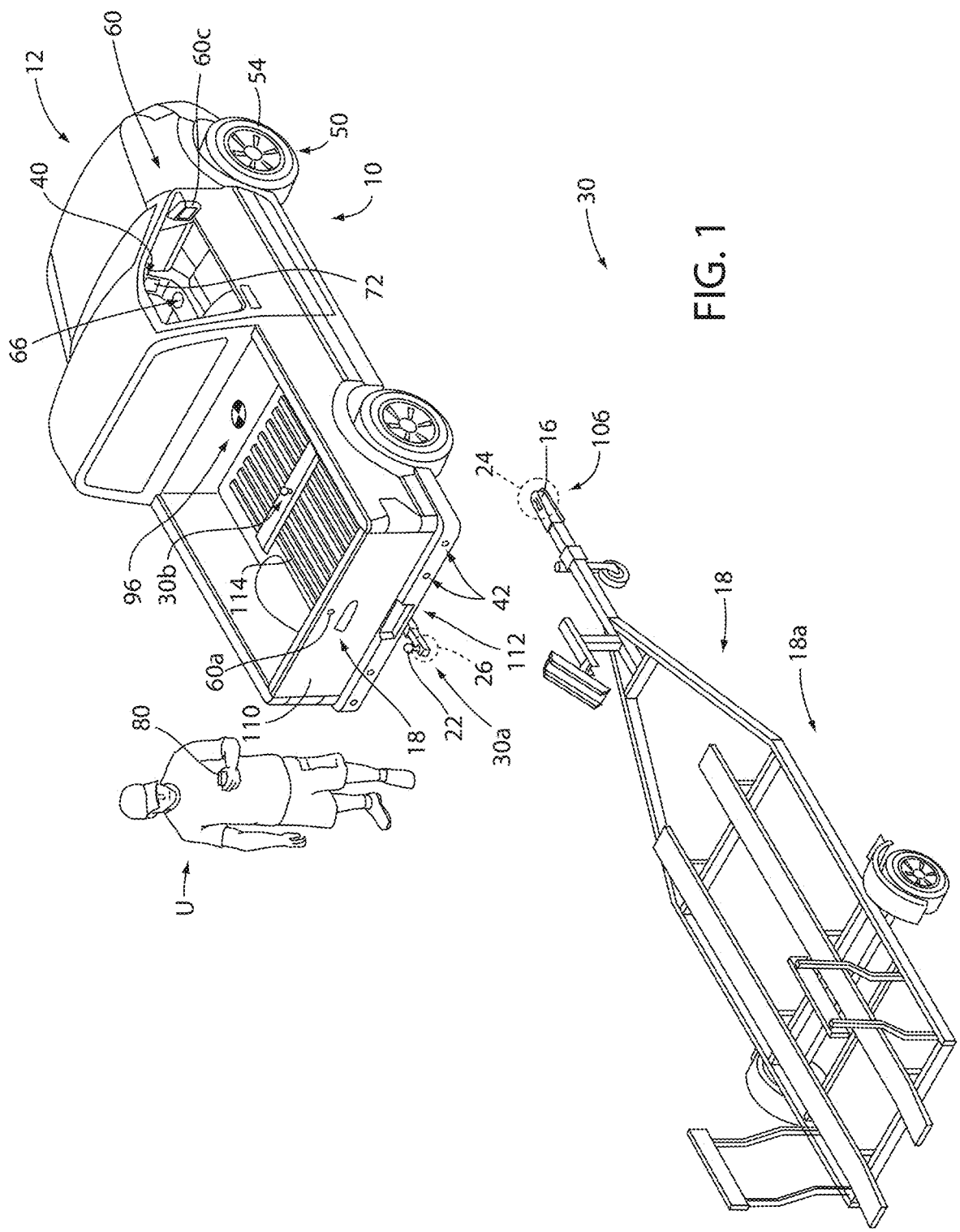
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch ball position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path 20 indicated by an operator or user U, etc. Accordingly, the disclosure may provide for the hitch assist system 10 to provide for improved navigation of the vehicle 12 and/or interaction with the coupler 16, such that trailer 18 may be effectively connected to the vehicle 12 without complication.

In operation, the system 10 may track a position of the trailer 18 and the coupler position 24 in image data or various sensory data captured by the vehicle 12 while maneuvering the vehicle 12 along the path 20. For successful operation, the tracking of the trailer 18 should be sufficiently accurate to ensure that the coupler position 24 remains within a maneuvering range of the vehicle 12. Such tracking of the trailer 18 and/or the coupler 16 may be accomplished by processing image data captured via an imaging system. An example of an imaging system is discussed later in reference to FIGS. 2 and 4.

In some implementations, the system 10 may be configured to process the image data or sensory data captured by the imaging system in order to identify a trailer type for connection with the vehicle 12. In such implementations, the vehicle 12 may be equipped with a first hitch 30a or a rear hitch, which may correspond to the hitch ball 22. Additionally, the vehicle 12 may be equipped with a second hitch 30b or a forward hitch, which may correspond to a gooseneck hitch or fifth wheel hitch positioned forward of the hitch ball 22 relative to the forward operating direction of the vehicle 12. Accordingly, as further discussed herein, the system 10 may be configured to identify the trailer type and the corresponding hitch (e.g. forward hitch or the rear hitch) compatible with the trailer type.

In response to the trailer type, the system 10 may be configured to identify the compatible hitch for connection with the trailer type as one of the first hitch 30a and the second hitch 30b. Based on the trailer type and the selected hitch, the system 10 may further be configured to instruct a user to adjust or set up the vehicle for connection with the trailer 18. Additionally, the controller of the system may select a navigation routine and calculate a corresponding vehicle path 20 to align the vehicle with the trailer 18 for connection. Such operation may considerably improve a user experience by simplifying a procedure for aligning the vehicle 12 with the trailer 18 for connection. Before discussing the specific details of the identification of the trailer type and the selection of the first hitch 30a or the second hitch 30b for alignment, the general operation of the system 10 is further detailed for background. The identification of the trailer type and selection of the corresponding hitch are discussed in further detail in reference to FIGS. 5-10.

Figure 2:
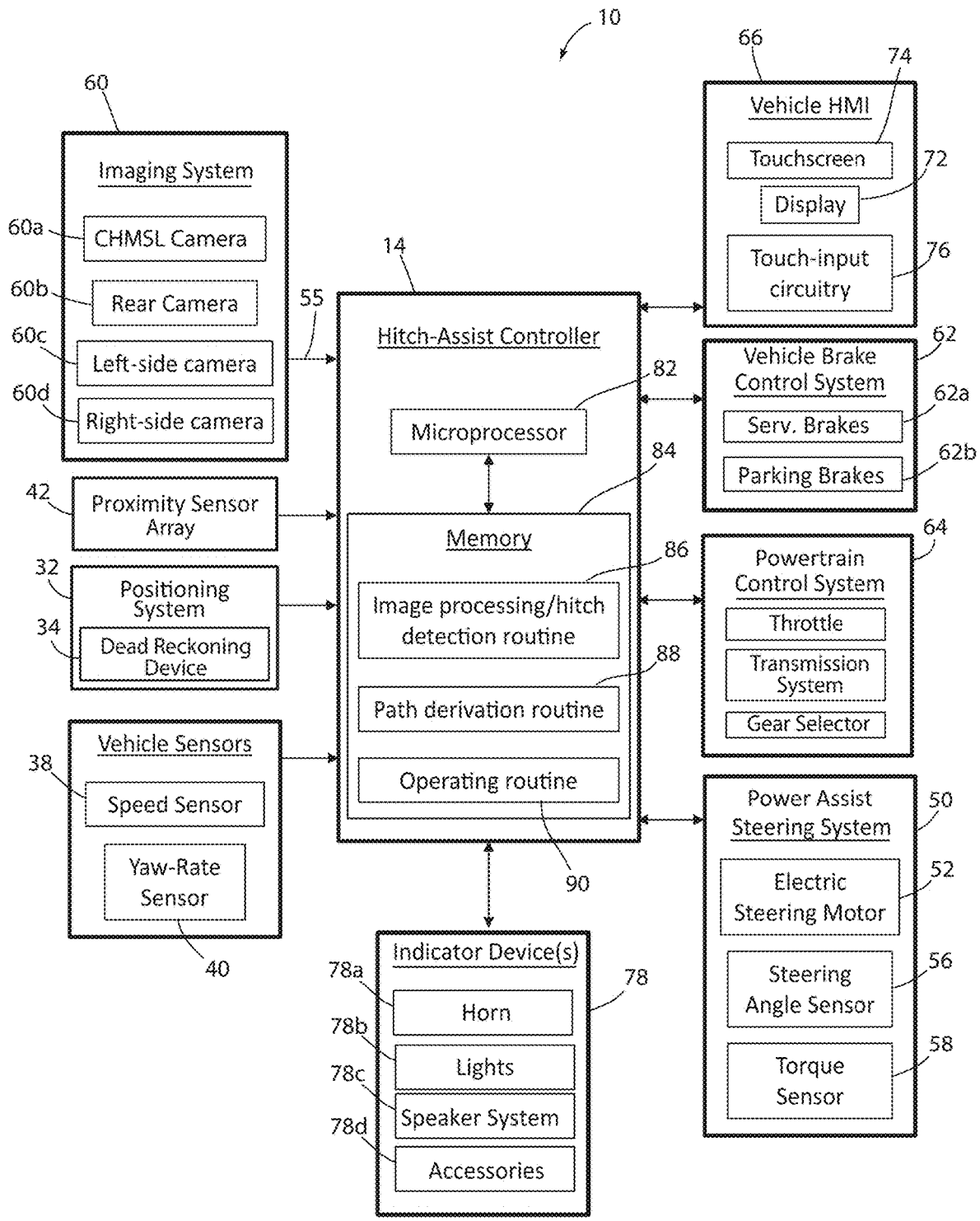
FIG. 2 is a diagram of a system according to an aspect of the disclosure for assisting in aligning the vehicle with a trailer in a position for hitching the trailer to the vehicle.
Figure 3:
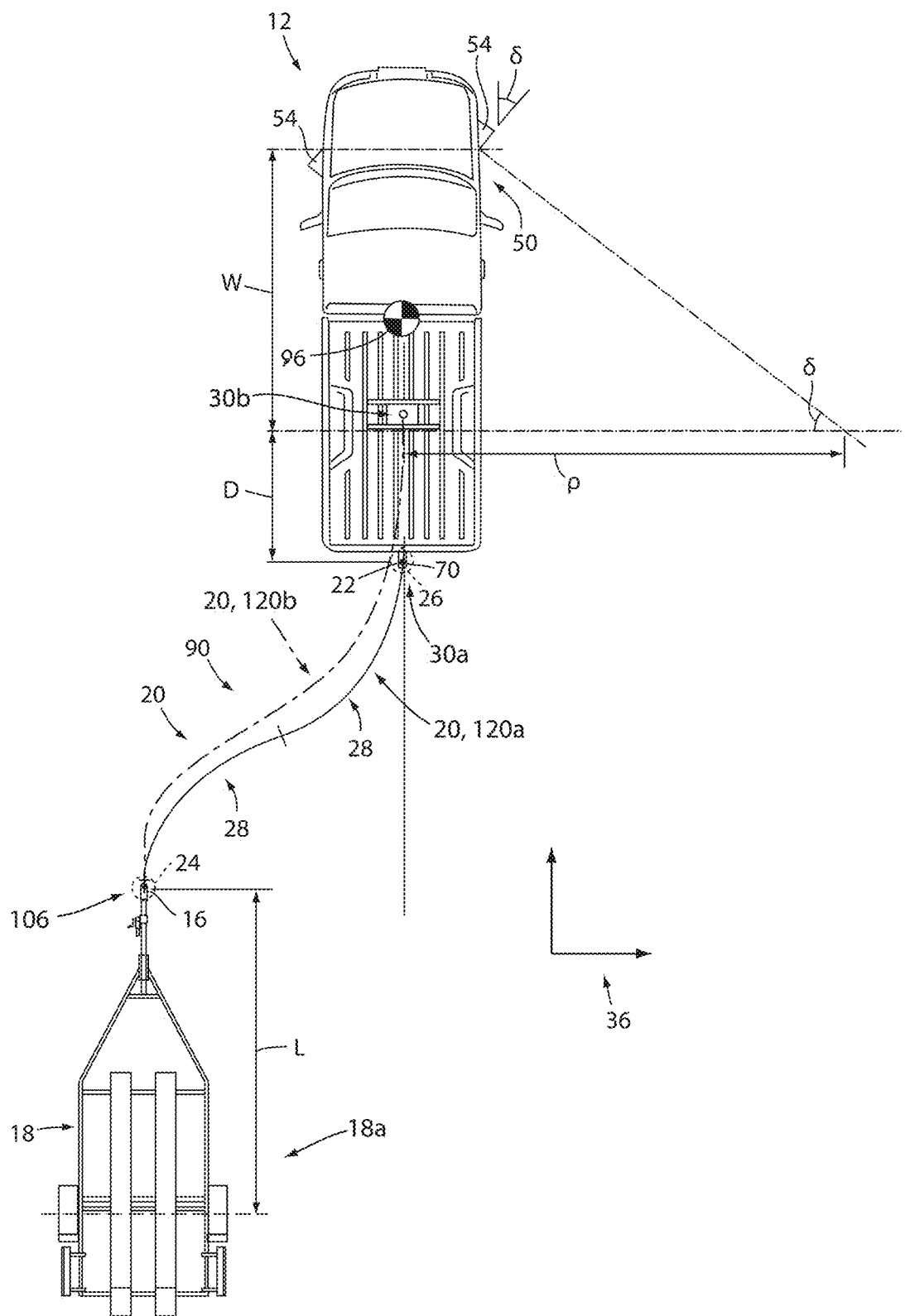
FIG. 3 is a plan view of a vehicle during a step of the alignment sequence with the trailer.
Figure 4:
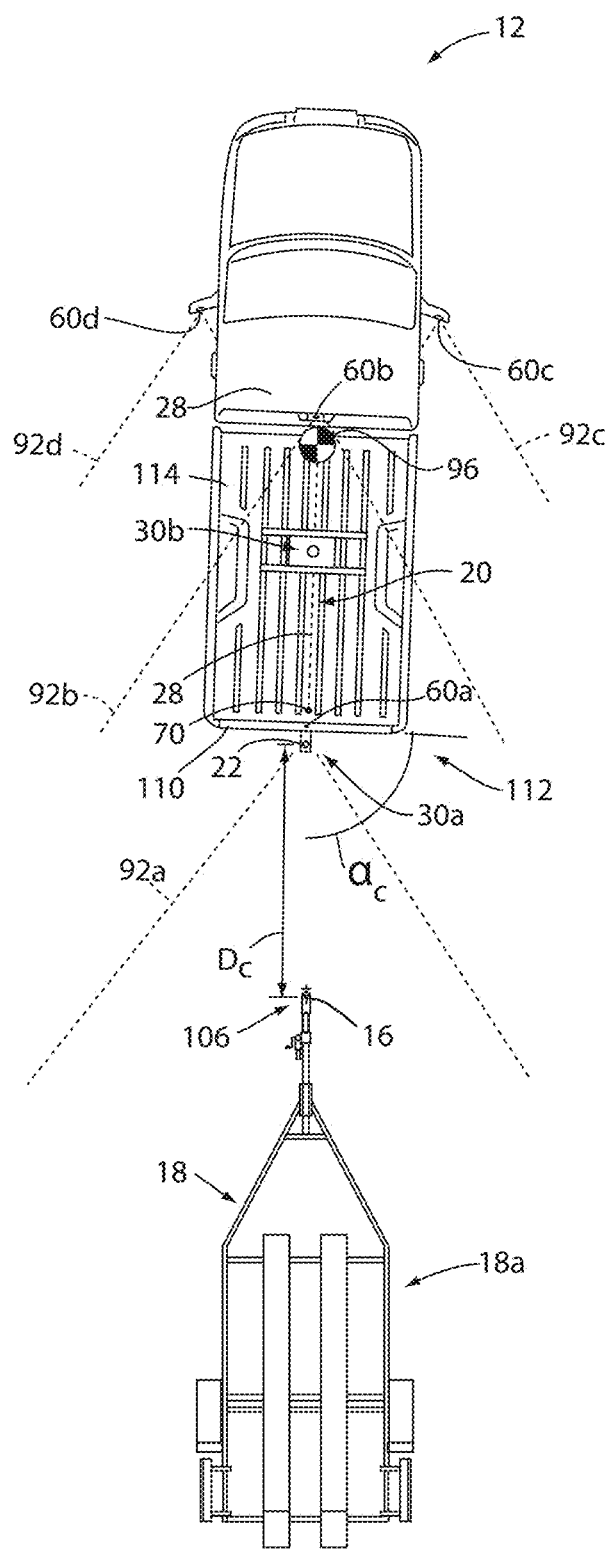
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height $H_c$ and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from the movement of the steered wheels 54 of such a vehicle.

With continued reference to FIG. 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions, to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a contact with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated contact with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent contact with trailer 18.

As previously discussed, the hitch assist system 10 may communicate with the human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

Hitch assist system 10 may also incorporate the imaging system 60 that includes one or more exterior cameras. Examples of exterior cameras are illustrated in FIG. 4 and include first rear camera 60a, second rear camera 60b, and side-view cameras 60c and 60d, although other arrangements including additional or alternative cameras are possible. The second rear camera 60b may be incorporated as a portion of or proximate to a center high mount stoplight of the vehicle 12. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with the first rear camera 60a, the second rear camera 60b, and the side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a-60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266, 023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to 96 hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view 92 of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W\tan\delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60a-60d of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of the vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92a of first rear camera 60a such that image data can be processed to determine the height $H_b$ of hitch ball 22 on a real-time or on-demand basis.

Figure 5:
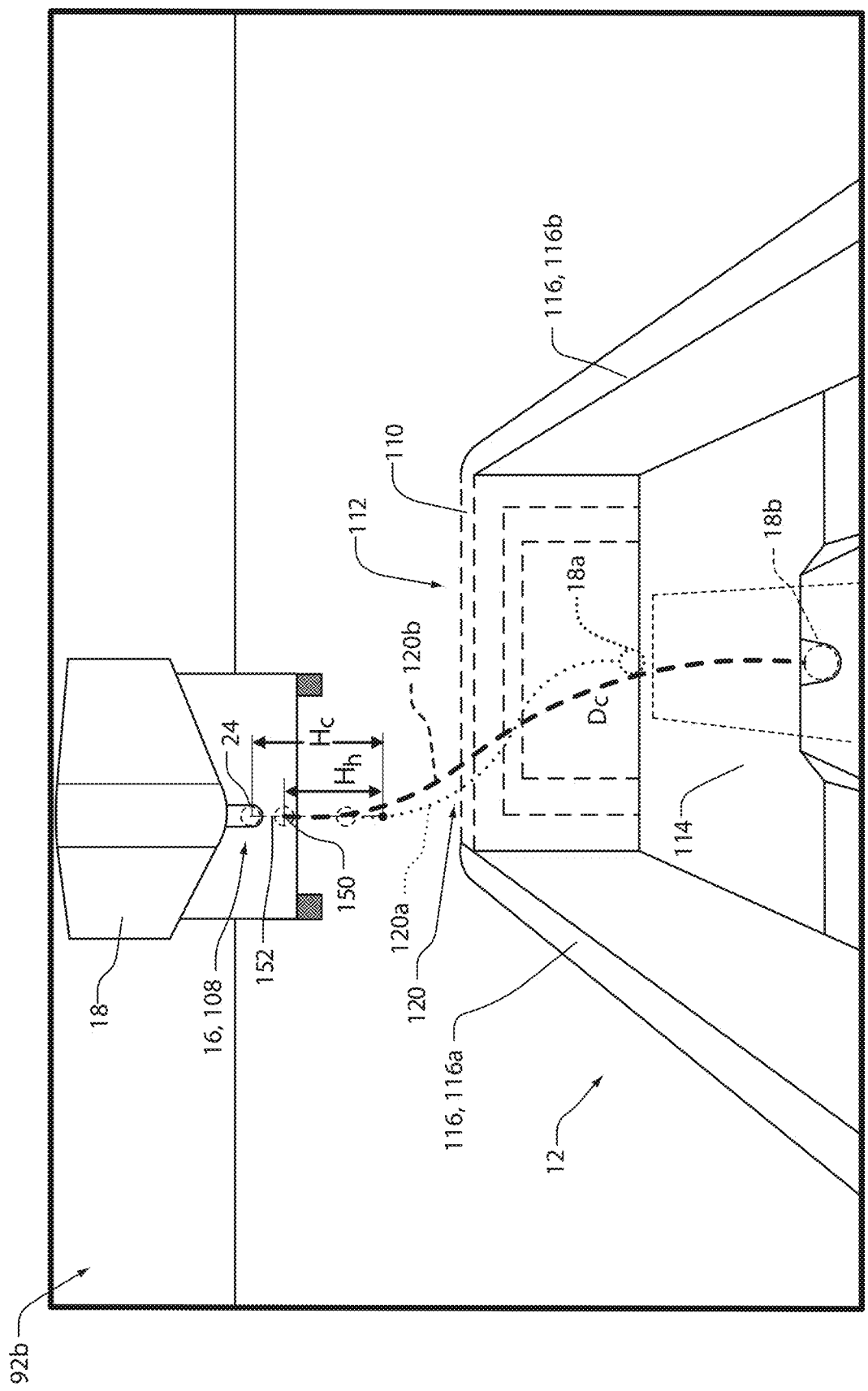
FIG. 5 is a projected view of image data demonstrating an alignment sequence with the trailer.

Referring to FIG. 5, as previously discussed, the hitch assist system 10 may be configured to control or guide the user U through an autonomous or semi-automated alignment process with the trailer 18. Accordingly, the controller 14 may identify the type or category of the trailer 18 and the corresponding coupler position 24 in the image data or various sensory data captured by the vehicle 12. In order to identify the trailer 18, the controller 14 may utilize one or more machine learning procedures or template recognition procedures, which may compare a geometry of the trailer 18 captured by one or more of the cameras 60a-60d of the imaging system 60. In this way, the system may identify a trailer type or coupler configuration of the trailer 18. For example, the controller 14 may utilize the recognition procedure to distinguish a first trailer type 18a from a second trailer type 18b. The first trailer type 18a may correspond to a conventional A-frame of trailer 18b as depicted in FIGS. 1 and 3. The second trailer type 18b may correspond to a gooseneck trailer 18a or a fifth-wheel trailer. Based on the trailer type, the controller 14 may determine whether the trailer 18 is compatible with the rear hitch 30a or the forward hitch 30b. Accordingly, the system 10 may be configured to identify a category or type of the trailer 18, a location of the coupler 16, and based on the trailer type, calculate a corresponding vehicle path 20 to align the first hitch 30a or the second hitch 30b with the coupler 16.

Referring now to FIGS. 1, 3, 5, 7, 8A and 8B; the first trailer type 18a and the second trailer type 18b are discussed in further detail. As previously discussed, the controller 14 of the system 10 may be configured to distinguish the trailer type between the first trailer type 18a configured for connection with the rear hitch 30a, shown in FIGS. 1 and 3, and the second trailer type 18b configured for connection with the forward hitch 30b, shown in FIGS. 5, 7, 8A, and 8B. The first trailer type 18a may correspond to a trailer comprising a conventional coupler 106, which may include A-frame coupler, a straight tongue coupler, a channel mount coupler, or other conventional trailers that may be configured to connect to the rear hitch 30a. The second trailer type 18b may correspond to a trailer comprising an elevated coupler 108, which may include a gooseneck or fifth-wheel trailer coupler configuration. The rear hitch 30a may be configured to connect a portion of the vehicle 12 located rearward of a tailgate 110 or otherwise connected to a posterior portion 112 of the vehicle 12. For clarity, the coupler 16 may generally refer to any type of trailer coupler, while the couplers 106 and 108 may be used to refer to the couplers corresponding to the first trailer type 18a and the second trailer type 18b.

The forward hitch 30b may be positioned in a cargo bed 114, cargo platform, or truck bed of the vehicle 12. The forward hitch 30b may correspond to a ball-type (gooseneck) hitch, a jaw-type fifth wheel hitch, or other hitch configurations. The forward hitch 30b may be located between a first side portion 116a and second side portion 116b of the cargo bed 114, which may correspond to sides of a truck bed of the vehicle 12. Accordingly, when aligning the vehicle 12 with the trailer 18 of the second trailer type 18b, the system 10 may be configured to navigate the elevated coupler 108 between the side portions 116 of the cargo bed 114. In order to complete such an alignment, it may be necessary or beneficial to open or remove the tailgate 110. As further discussed herein, the controller 14 of the system 10 may be configured to detect a position or orientation (e.g. open or closed) of the tailgate 110 or otherwise detect if the tailgate 110 is removed based on the image data captured by the second rear camera 60b (e.g. a CHMSL camera). Though discussed in reference to the cargo bed 114, the forward hitch 30b may similarly connected to a cargo platform of the vehicle 12.

In operation, the controller 14 may begin an alignment routine in response to an activation or input received from the user U. In response to the activation of the alignment routine, the controller 14, may capture image data via imaging system 60 via the first rear camera 60a and/or the second rear camera 60b. Based on the image processing routine 86, the controller 14 may identify the trailer type 18a or 18b. In response to the trailer type being identified as the first trailer type 18a, the controller 14 may implement the path derivation routine 88 to calculate a first navigation path 120a aligning the rear hitch 30a with the conventional coupler 106. In response to the trailer type being identified as the second trailer type 18b, the controller 14 may implement the path derivation routine 88 to calculate a second navigation path 120b aligning the forward hitch 30b with the elevated coupler 108. As depicted in FIG. 5, the second navigation path 120b may be configured to pass the elevated coupler 108 through an opening formed between the side portions 116 of the cargo bed 114. Additionally, the controller 14 may verify that the tailgate 110 is opened or removed to ensure uninterrupted operation along the second navigation path 120b. Once the navigation path 120 compatible with the trailer type 18a or 18b is calculated, the controller 14 may implement the operating routine 90 to control the vehicle 12 to align the vehicle 12 for attachment with the trailer 18.

Figure 6:
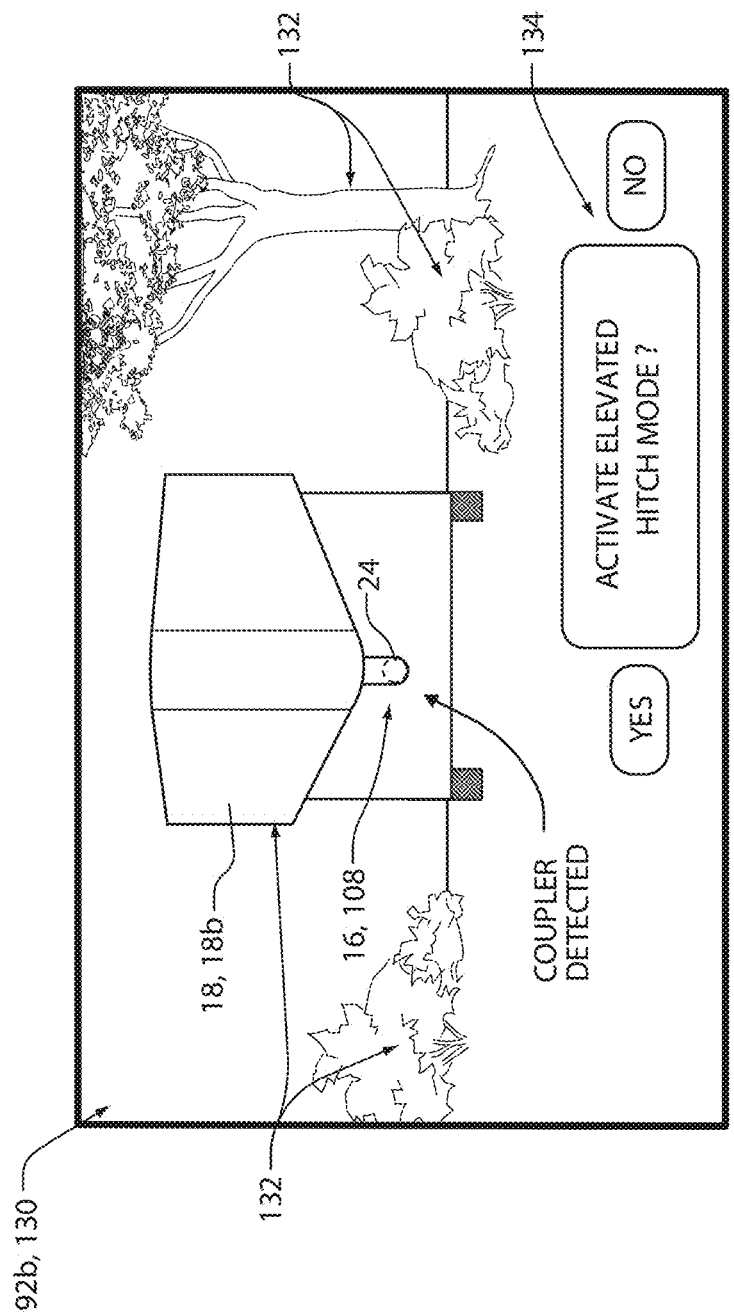
FIG. 6 is a projected view of image data demonstrating a trailer with an elevated coupler.

FIG. 6 demonstrates the image data 130 depicting the trailer 18 captured in one of the fields of view 92a, 92b of the first rear camera 60a and the second rear camera 60b, respectively. Referring now to FIGS. 5 and 6, the identification of the trailer 18 may be achieved via one or more image processing and object recognition methods. Such operations may include a comparison of the various objects 132 including the trailer 18 identified in the image data 130. The detection of the trailer 18 in the image data 130 may be initiated in response to an input from the user U to the HMI 66 initiating the alignment routine. Successful initiation of the detection of the trailer 18 may require that the trailer 18 is in one of the fields of view 92a, 92b of the first rear camera 60a and the second rear camera 60b. In operation, the objects 132 detected in the image data 130 may be compared to a plurality of templates or predetermined configurations typical of each of the trailer types 18a, 18b in order to determine the type 18a or 18b depicted.

As discussed herein, the image processing routine 86 is described as being implemented to identify the trailer 18 from the objects 132, the trailer type 18a or 18b, and the coupler position 24. In operation, the controller 14 may process the image data via a variety of methods. In some implementations, the controller may initially process the image data via a preprocessing that may be configured to crop each image frame captured by the cameras 60a-60d. During such an operation, a pre-processing module of the imaging system 60a or the controller 14 may augment the image data by various techniques including, but not limited to, cropping, flipping, rotating, translating, scaling, color-enhancing, histogram stretching, noise filtering, selective noise inclusion, etc. Following processing of the image data via the image pre-processing module, the controller 14 may further process the image data via one or more digital image processing or feature recognition techniques (e.g. Hough transform) to identify geometric shapes that may correspond to the trailer. Once identified, the controller 14 may compare the identified shapes with a variety of templates corresponding to the trailer types 18a, 18b.

Based on the comparison, the controller 14 may identify the trailer type 18a, 18b and in some implementations may prompt the user U to verify the trailer type 18a, 18b prior to initiating the operating routine to align the vehicle 12 for connection with the trailer 18. As shown in FIG. 6, a prompt 134 is depicted on the display 72 of the HMI 66. The prompt 134 may request a verification from the user U verifying that the identified hitch type (e.g., the second trailer type 18b) is accurately identified. Such verification may activate the system 10 to control the vehicle 12 to initiate the alignment routine. Additionally, the controller 14 may demonstrate the coupler position 24 detected for the coupler 16 such that the user U may verify the location for alignment. Further discussion of the alignment routine is discussed in reference to FIGS. 9 and 10.

Figure 7:
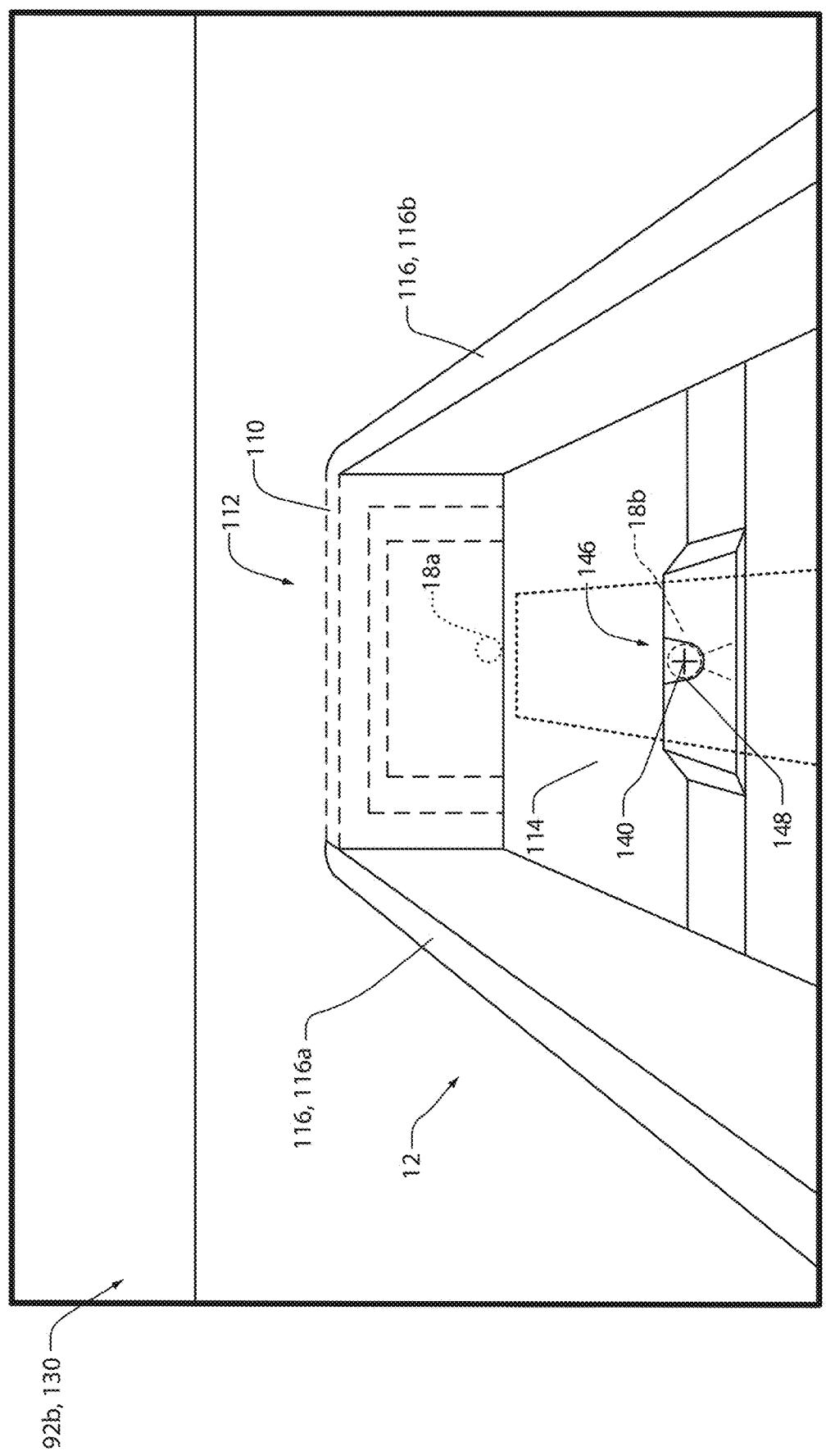
FIG. 7 is a projected view of image data demonstrating a cargo bed of a vehicle comprising a forward coupler for connection with an elevated coupler.

Referring now to FIGS. 5 and 7, in some implementations, the controller 14 may be configured to detect a forward hitch position 140 of the forward hitch 30b based on the image data captured by the second rear camera 60b (e.g. a CHMSL camera). As shown in FIG. 6 the field of view 92b of the second rear camera 60b is shown depicting a cargo bed 114 (e.g. a truck bed). The cargo bed 114 may be enclosed on two sides by the first side portion 116a and the second side portion 116b, which may correspond to box sides of the cargo bed 114.

Additionally, the cargo bed 114 may be enclosed on a third side by the tailgate 110. In operation, the controller 14 may be configured to detect the forward hitch position 140 in relation to the an opening 146 formed by a jaw coupler for a fifth wheel or based on a location of a forward hitch ball 148 of a gooseneck trailer, each of which may be configured to receive the elevated coupler 108 of the second hitch type 18b. Based on a comparison of the forward hitch position 140 to the coupler position 24 of the elevated coupler 108, the controller 14 may calculate the second navigation path 120b as demonstrated in FIG. 5.

Additionally, in some implementations, the controller 14 may be configured to detect a hitch height $H_h$ of the forward hitch 18b as well as a coupler height $H_C$ of the elevated coupler 108. Utilizing the image processing routine 86, the controller 14 may process the image data including focal length information from the image data to determine a distance $D_c$ to the elevated coupler 108 as well as the approximate height $H_C$ of the elevated coupler 108. Based on the coupler position 24 in combination with the height $H_C$ of the elevated coupler 108, the controller 14 may further project an approximation of a target location 150 for the forward hitch 18b to align along a vertical distance from the elevated coupler 108. Accordingly, the controller 14 may be configured to project the target location 150 along a vertical z-axis 152 from the identified coupler position 24. In this way, the controller 14 may apply the path derivation routine 88 to determine the second navigation path 120b for the elevated coupler 108.

Figure 8A:
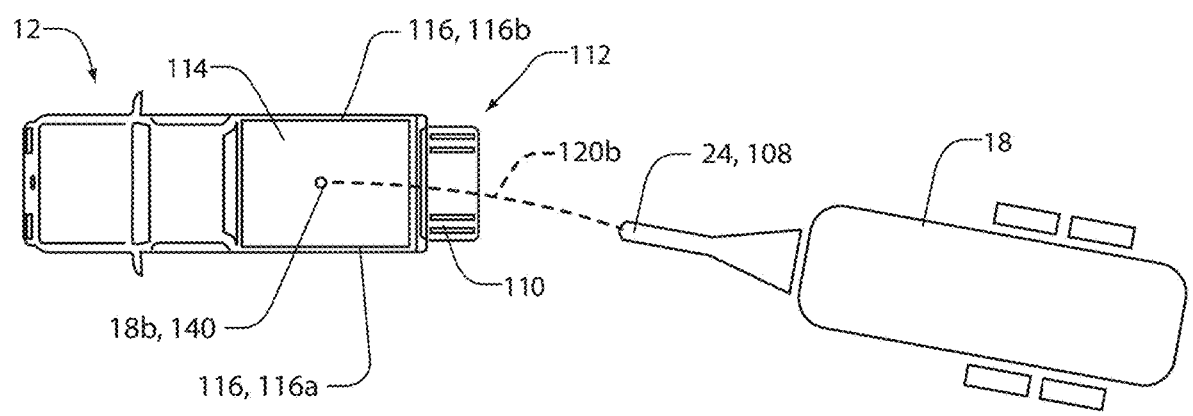
FIG. 8A is a plan view of a vehicle and a trailer demonstrating an alignment routine.
Figure 8B:
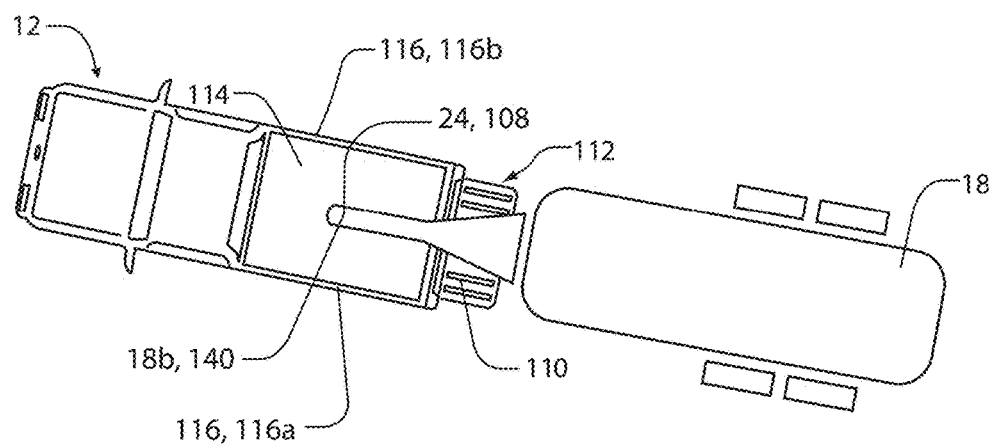
FIG. 8B is a plan view of a vehicle and a trailer demonstrating an alignment routine.

Referring now to FIGS. 8A and 8B, plan views of the vehicle 12 and the trailer 18 are shown. As previously discussed, the controller 14 may begin an alignment routine in response to an activation or input received from the user U. The activation may be initiated by the user with the trailer 18 located in the fields of view 90a, 90b. In response to the activation of the alignment routine, the controller 14, may capture image data via imaging system 60 via the first rear camera 60a and/or the second rear camera 60b. The controller 14 may then process the image data via the image processing routine 86 to identify whether the trailer 18 is of the first trailer type 18a or the second trailer type 18b. Based on the detected trailer type 18a or 18b, the controller 14 may display the prompt 134 requesting a verification of the trailer type 18a or 18b. Based on the trailer type 18a or 18b, the controller 14 may then calculate the path 20 to align the vehicle 12 for connection with the trailer 18 via the first navigation path 120a or the second navigation path 120b via the path derivation routine 88. Though described as being automatically detected, the trailer type 18a or 18b may also be selected by the user U on the HMI 66 and/or programmed via a trailer registration or enrollment routine.

As depicted in FIGS. 8A and 8B, the trailer type is depicted as the second trailer type 18b. Accordingly, the controller 14 may monitor the location of the trailer 18 via the second rear camera 60b. Additionally, the controller 14 may detect the forward hitch position 140 in the field of view 92b as well as detect whether tailgate 110 needs to be opened or removed prior to initiating the operating routine 90. Once activated, the controller 14 may be in communication with various control components and devices (e.g. 50, 60, 62, 64, 66, 78, etc.) of the system 10 such that the vehicle 12 is directed along the second navigation path 120b, which may be configured to pass the elevated coupler 108 through an opening formed between the side portions 116 of the cargo bed 114. In this way, the controller 14 may automatically identify the trailer type 18a or 18b and calculate a path configured to align the elevated coupler 108 or the conventional coupler 106 based on the detected trailer type 18a or 18b.

Figure 9:
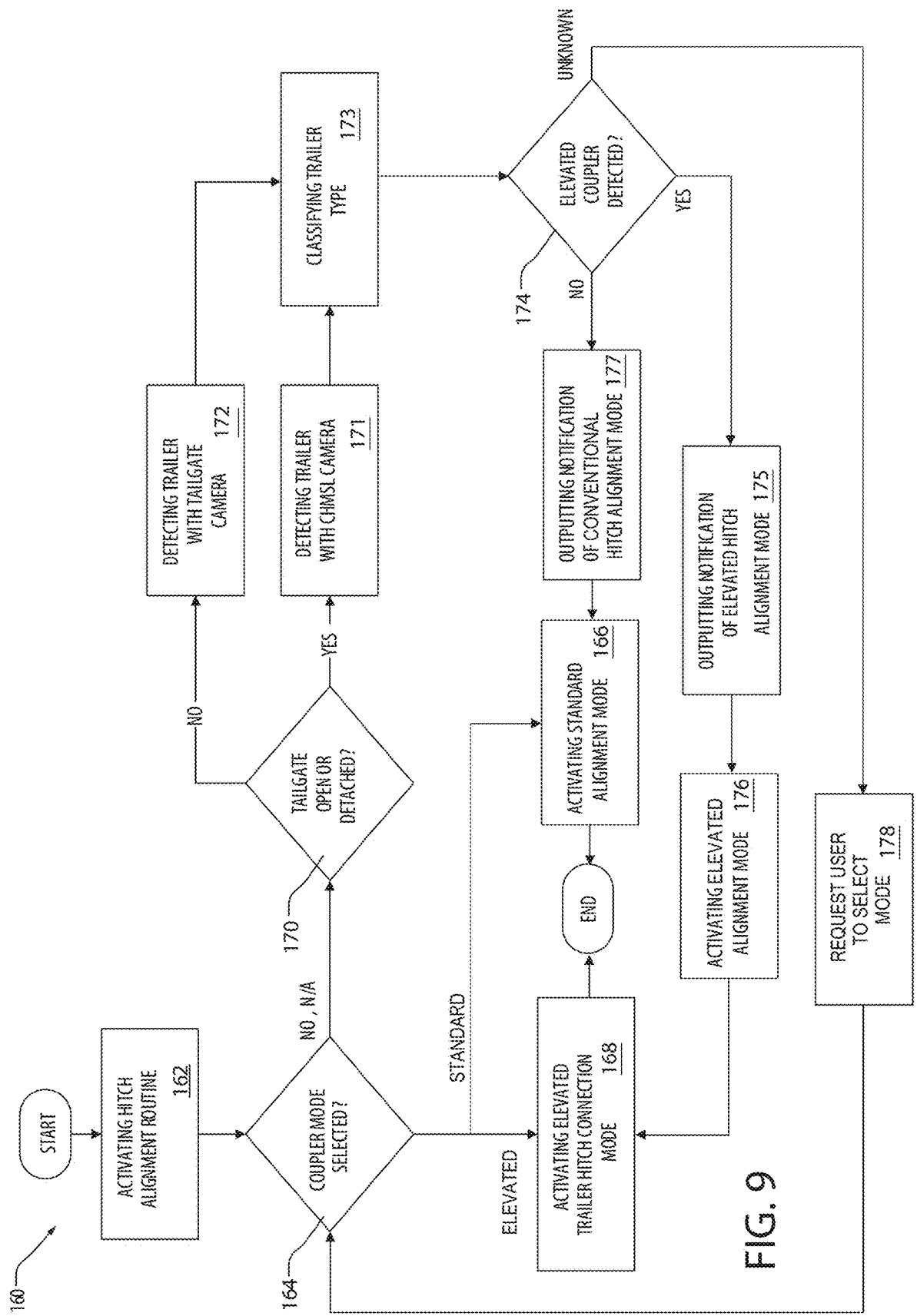
FIG. 9 is a flow chart demonstrating a method aligning a vehicle for connection with a trailer.

Referring now to FIG. 9, a flow chart is shown demonstrating a method 160 for identifying the trailer type 18a or 18b and controlling the vehicle 12 to align for attachment with the trailer 18. The method 160 may begin in response to an activation of the hitch alignment routine (162). In response to the activation of the hitch alignment routine, the controller 14 may prompt the user U via the HMI to select a mode of operation based on the trailer type 18a or 18b (164). If the coupler mode (e.g. conventional 106 or elevated 108) is selected in step 164, the method 160 may activate the system 10 to control the vehicle to align with the elevated coupler 108 via the first navigation path 120a corresponding to the standard or conventional coupler 106 (166) or the second navigation path 120b corresponding to the elevated coupler 108 (168). If the coupler mode is not selected in step 164, the method may continue to detect whether the tailgate 110 is in an open position or detached from the vehicle 12 (170). As previously discussed in reference to FIG. 7, the controller 14 may determine if the tailgate 110 is in an open position or detached from the vehicle 12 based on the image data captured by the second rear camera 60b, which may be incorporated in or connected to the vehicle proximate to the CHMSL.

The status of the tailgate 110 may also be determined by various other methods. In some instances, the status of the tailgate 110 may be determined based on a status signal of the first rear camera 60a or by image data captured by the first rear camera 60a. For example, if the first rear camera 60a is in connection with the tailgate 110 and the tailgate is removed from the vehicle 12, the controller 14 may update the status of the tailgate 110 as being removed due to a lack of connectivity to the vehicle 12. In some implementations, the controller 14 may compare the image data captured via the first rear camera 60a with the image data captured via the second rear camera 60b to determine the status or position of the tailgate 110. If the image data captured by the first rear camera 60a differs significantly from that of the second rear camera 60b and/or a focal distance of the first rear camera 60a is approximately the same as a height of the tailgate from the ground, the controller may determine that the tailgate is open. In this way, the controller 14 may automatically determine whether the tailgate 110 is opened or disconnected from the vehicle 12.

If the tailgate 110 is in the open position or detached from the vehicle 12, the controller 14 may activate the second rear camera 60b to capture image data depicting the trailer 18 (171). If the tailgate 110 is in the closed position, the controller 14 may activate the first rear camera 60a to capture image data depicting the trailer 18 (172). Once activated, the controller 14 may process the image data captured by either or both of the rear cameras 60a, 60b to identify or classify the trailer type 18a or 18b (173). Based on the trailer type 18a, 18b, the controller 14 may identify the corresponding coupler 16 as the conventional coupler 106 (e.g., A-frame coupler, a straight tongue coupler, a channel mount coupler, etc.) or the elevated coupler 108 (e.g., gooseneck or fifth wheel coupler) (174). In response to identifying the elevated coupler 108, the controller 14 may output a notification to the user U (e.g., via the display 72 of the HMI 66) that the system 10 is operating in an elevated hitch mode (175) and continue to activate the alignment mode for the elevated coupler 108 (176). In response to identifying the conventional coupler 106, the controller 14 may output a notification to the user U (e.g., via the display 72 of the HMI 66) that the system 10 is operating in a conventional hitch mode (177) and continue to step 166. In response to the coupler 16 not being successfully identified in step 174, the controller 14 may output a request to the user U to select a mode for alignment via the HMI 66 (178) and return to step 164. Following the alignment of the vehicle 12 for connection with the trailer 18, the method 160 may conclude.

Figure 10:
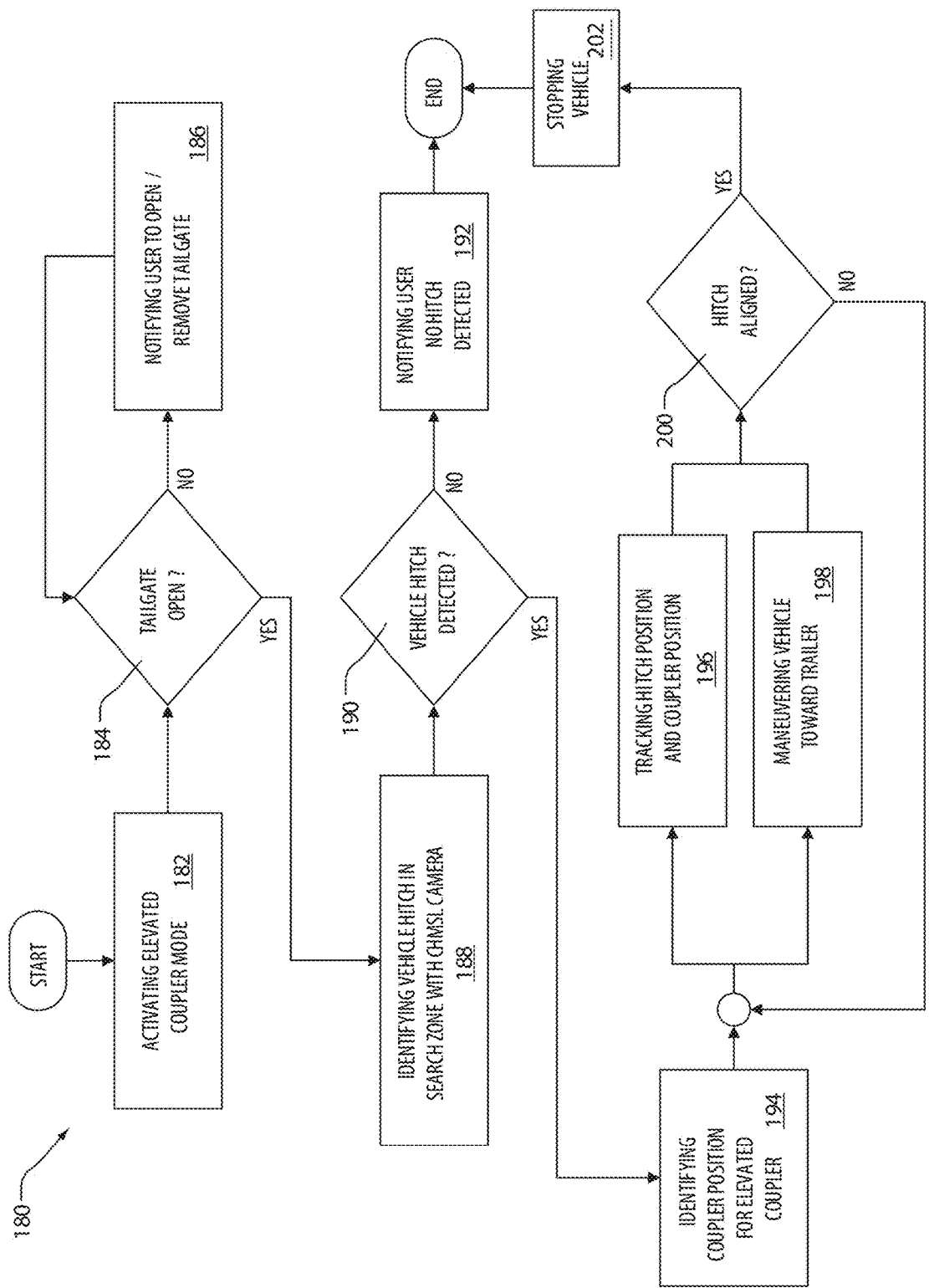
FIG. 10 is a flow chart demonstrating a method aligning a vehicle for connection with a trailer.

Referring now to FIG. 10, a flow chart is shown demonstrating a method 180 for identifying the trailer type 18a or 18b and controlling the vehicle 12 to align for attachment with the trailer 18. The method 180 may begin in response to an activation of the hitch alignment routine, which may include an indication identified by the user U via the HMI activating the elevated coupler mode (182). Once activated, the controller 14 may identify whether the tailgate 110 is open or detached from the vehicle 12 as previously discussed in reference to FIG. 10 (184). If the tailgate 110 is closed and/or connected, the controller 14 may prompt the user U via the HMI 66 to open or remove the tailgate 110 (186). If the tailgate 110 is open or removed, the controller 14 may process image data from the second rear camera 60b in a search zone in the cargo bed 114 (188). Based on the image data in the search zone, the controller 14 may determine if the forward hitch 30b is present in the cargo bed 114 (190). In response to the forward hitch 18b not being detected in step 188, the controller 14 may output a notification to the user U (e.g., via the HMI 66) that the forward hitch 18b is not detected and end the routine (192).

In response to the detection of the forward hitch 18b, the controller 14 identify the coupler position 24 of the elevated coupler 108 with the second rear camera 60b (194). Once identified, the controller 14 may calculate the second navigation path 120b. With the second navigation path 120b for the elevated coupler 108, the controller may track the forward hitch position 140 as well as coupler position 24 (196) in combination with controlling the system 10 to navigate the vehicle along the second navigation path 120b (198). The controller 14 may then continue to control the maneuvering of the vehicle 12 while monitoring the coupler position 24 of the elevated coupler 108 until the forward hitch 18b is in alignment with the elevated coupler 108 (200). Once alignment is achieved, the controller 14 may control the system 10 to stop the vehicle 12 in an aligned configuration for connection with the trailer 18 (202) and method 180 may conclude. Though the method steps discussed in reference to FIGS. 9 and 10 are described in a specific order, the steps may vary in order and timing. Additionally, the steps of the method 160 may be combined or interchanged with various similar steps of the method 180 without departing from the spirit of the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
   a first image sensor in connection with a portion of the vehicle and positioned forward of a forward hitch disposed in a cargo bed of the vehicle;
   a controller configured to:
   capture first image data with the first image sensor, wherein the first image data depicts a coupler of a trailer;
   identify a trailer type of the trailer based on the first image data, wherein the trailer type is determined as a first type configured to connect with a rear hitch of the vehicle and a second type configured to connect to the forward hitch;
   acquire position data identifying a coupler position of the coupler in the first image data;
   activate a type-specific navigation operation of the vehicle based on the trailer type;
   derive a vehicle path aligning the rear hitch or the forward hitch with the coupler in response to the coupler position; and
   control a maneuvering system driving the vehicle along the vehicle path.

2. The hitch assistance system according to claim 1, wherein the controller is further configured to distinguish the trailer type as a fifth-wheel trailer or a gooseneck trailer from an A-frame trailer.

3. The hitch assistance system according to claim 1, further comprising a user interface, wherein the controller is configured to prompt a user to verify the navigation operation of the trailer based on the trailer type.

4. The hitch assistance system according to claim 1, wherein the vehicle path directs the coupler through an opening formed by an open or removed tailgate between a plurality of side portions of the cargo bed.

5. The hitch assistance system according to claim 1, wherein the coupler of the trailer is elevated and configured to extend above the storage compartment in the form of a fifth wheel or gooseneck coupler.

6. The hitch assistance system according to claim 1, wherein the controller is further configured to:
project a target hitch position along a height of a projected z-axis of the coupler; and
control the maneuvering system driving the vehicle to align the hitch with the projected target hitch position.

7. The hitch assistance system according to claim 1, wherein the first image sensor is positioned above a rear windscreen of the vehicle.

8. The hitch assistance system according to claim 7, wherein the controller is further configured to:
detect a position of the forward hitch in the cargo bed by processing the first image data.

9. The hitch assistance system according to claim 1, wherein the controller is further configured to:
detect at least one of an open status and a connection status of a tailgate of the vehicle based on the first image data.

10. The hitch assistance system according to claim 1, further comprising a second image sensor configured to capture second image data in connection with a tailgate or a portion forming a rear extent of the vehicle.

11. The hitch assistance system according to claim 10, wherein the controller is further configured to:
detect a status of the tailgate based on a connection status of the second image sensor in connection with a portion of the vehicle aft of the forward hitch.

12. The hitch assistance system according to claim 10, wherein the status of the tailgate is identified in response to the second image data captured by the second image sensor depicting a ground portion different from a scene depicted in the second image data.

13. The hitch assistance system according to claim 10, wherein the status of the tailgate is identified by comparing the first image data captured by the first image sensor with the second image data captured by the second image sensor.

14. The hitch assistance system according to claim 1, wherein a coupler position boundary is identified by processing the first image data, wherein the coupler position boundary is defined by the side portions and the forward hitch, and wherein the vehicle path directs the coupler through an opening formed by an open or removed tailgate within the coupler position boundary.

15. A method for controlling an automated vehicle hitch assistance system, the method comprising:
capturing first image data with a first image sensor in connection with a portion of the vehicle and positioned forward of a forward hitch position in a cargo bed of the vehicle;
identifying a coupler position and a trailer type of a trailer in the first image data, wherein the trailer type is one of a first type configured to connect with a rear hitch of the vehicle and a second type configured to connect to the forward hitch;
in response to the trailer type being identified, activating a type-specific navigation operation of the vehicle;
in response to the trailer type being configured to connect with the forward hitch, detecting:
a presence of the forward hitch in the cargo bed based on the first image data; and
a plurality of side portions that laterally bound the cargo bed based on first image data;
in response to a negative search result for the forward hitch in the cargo bed, outputting an indication that the forward hitch is not identified; and
in response to a positive search result for the forward hitch in the cargo bed, controlling the vehicle to maneuver the forward hitch position to align with the coupler position, wherein the vehicle path directs the coupler through an opening formed by an open or removed tailgate between the plurality of side portions of the cargo bed.

16. The method according to claim 15, further comprising:
detecting a forward hitch position between the side portions of the forward hitch in the image data; and
calculating an alignment path from the forward hitch position to the coupler position, wherein the alignment path extends between the coupler and the forward hitch through the opening formed by an open or removed tailgate between the plurality of side portions of the cargo bed.

17. A vehicle hitch assistance system, comprising:
an image sensor in connection with a portion of the vehicle and positioned forward of a forward hitch disposed in a cargo bed of the vehicle;
a controller configured to:
capture image data with the image sensor, wherein the image data depicts a coupler of a trailer;
acquire position data identifying a coupler position of the coupler in the first image data;
identify a trailer type of the trailer based on the first image data, wherein the trailer type is determined as a first trailer having a first coupler height configured to connect with a rear hitch of the vehicle or a second trailer having a second coupler height configured to connect to the forward hitch;
detect at least one of a status of a tailgate of the vehicle based on the first image data;
in response to the tailgate being oriented in a closed position, output a notification indicating the closed position;
activate a type-specific navigation operation of the vehicle based on the trailer type;
derive a vehicle path aligning the rear hitch or the forward hitch with the coupler position, wherein the vehicle path comprises type-specific navigation based on the trailer type; and
control a maneuvering system driving the vehicle along the vehicle path.

18. The method according to claim 15, further comprising:
identifying a coupler position boundary within the cargo bed defined by the side portions and the forward hitch; and
controlling a maneuvering system driving the vehicle to direct the coupler through an opening formed by an open or removed tailgate into the coupler position boundary with the cargo bed.

19. The method according to claim 17, further comprising:
- capturing image date with the image sensor, wherein the image data depicts a current position of the forward hitch;
- detecting a current height of the forward hitch; and
- deriving a projected height of the forward hitch.

* * * * *